METHOD FOR PRODUCING MAGNETIC KEEPERS
Filed Dec. 21, 1971
FIG. 1
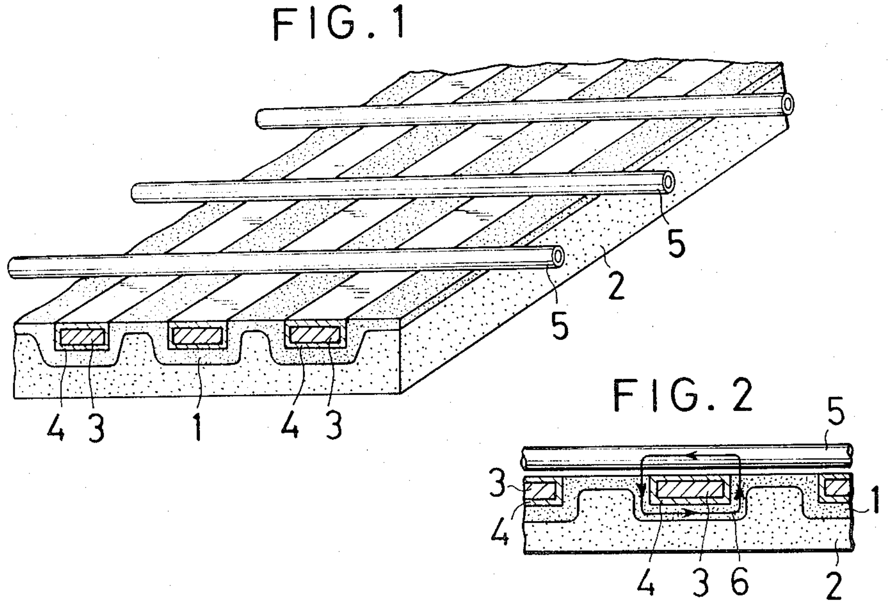
FIG. 1, FIG. 2
FIG. 3
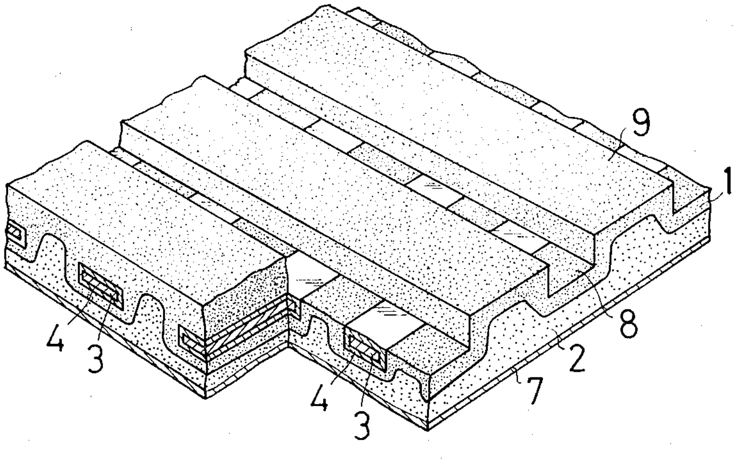
INVENTOR.
BY United States Patent Office 3,788,924

Patented Jan. 29, 1974

3,788,924
METHOD FOR PRODUCING MAGNETIC KEEPERS

Seihin Kobayashi, Michihiro Torii, and Masanao Okuda, Shizuoka-ken, Japan, assignors to Fuji Electrochemical Co., Ltd., Tokyo, Japan Filed Dec. 21, 1971, Ser. No. 210,379
Claims priority, application Japan, Dec. 23, 1970, 45/118,000
Int. Cl. B32b *5/12, 31/20*
U.S. Cl. 156—249 4 Claims

ABSTRACT OF THE DISCLOSURE

A flexible ferrite sheet containing fine ferromagnetic ferrite powders cohesively bonded together by a plastic binder and a flexible sheet containing fine powders of non-magnetic substance cohesively bonded together by a plastic binder are laminated and subjected to pressure to form a monolithic composite sheet. A plurality of parallel driving wires are embedded into the ferromagnetic ferrite sheet side of the monolithic composite sheet to effect plastic deformation of the non-magnetic sheet portion along with deformation of the ferrite sheet portion.

This invention relates to a method for producing magnetic keepers to be used for magnetic wire memories.

In a conventional magnetic keeper of this type, a plurality of parallel grooves for receiving driving wires have been formed on the surface of a sintered ferrite sheet by a so-called grain working method such as, for example, diamond cutting. Alternatively, a plurality of parallel driving wires have been pressed against the surface of a plastic ferrite sheet containing ferromagnetic fine ferrite powders and thereby embedded therein with their upper surface exposed to the outside of the sheet.

However, the magnetic keepers produced in accordance with such known methods have some vital defects. For instance, the flux path is inevitably expanded due to a diamagnetic field generated during driving and magnetization of the keeper, thereby increasing undesirable interaction of adjacent magnetic flux as the packing density of memory elements becomes higher. Accordingly, the space between adjacent driving wires has been limited to about 1.2 mm. at most.

If, however, most of the periphery of each driving wire is surrounded with ferrite substance and the spaces between each adjacent driving wires is filled up with non-magnetic substance, the magnetic flux around one driving wire will be magnetically isolated from that of the adjacent driving wires, thus allowing increase of the packing density of memory elements without causing any undesirable interaction of the adjacent magnetic flux. This will make it possible to produce a magnetic keeper of high capacity but having a small load.

Accordingly, an object of the present invention is to provide a method for producing with ease a magnetic keeper in which most of the periphery of each driving wire is surrounded with ferrite substance but the space between each adjacent driving wire is filled up with non-magnetic substance.

According to the present invention, a method for producing magnetic keepers comprises the steps of forming a flexible ferrite sheet containing fine ferromagnetic ferrite powders cohesively bonded together by a plastic binder and a flexible sheet containing fine powders of non-magnetic substance cohesively bonded together by a plastic binder, forming a monolithic composite sheet by laminating one of the sheets upon the other and subjecting them to pressure, and embedding a plurality of parallel driving wires into the ferromagnetic ferrite sheet side of said monolithic composite sheet to effect plastic deformation of the flexible non-magnetic sheet portion along with deformation of the flexible ferrite sheet portion.

Thus, as the driving wires are embedded under pressure into the ferromagnetic side of the monolithic composite sheet so as to effect plastic deformation of the flexible non-magnetic sheet portion along with the deformation of the flexible ferrite sheet portion, the driving wires are enclosed by the ferromagnetic ferrite substance, while the portions outside and between the deformed ferromagnetic ferrite portions are filled up with the non-magnetic substance.

The ferromagnetic ferrite powders used to produce the magnetic keeper according to the present invention are ones which have gone through sintering and been pulverized to a grain size of several microns and which have high magnetic permeability, high coercive force and high insulation resistance. The binders used in the present method in admixture with said fine ferrite powders are, preferably, thermoplastic resins such as polyvinyl butyral, or thermosetting resins such as epoxy resin, or admixtures thereof. The mixture is mixed with a solvent such as for example ethyl alcohol and subjected to rolling such as calender rolling or the like, so that a flexible magnetic sheet is obtained which is electrically insulative and has specific magnetic permeability of about 7 to 23.

The non-magnetic substance used to produce the magnetic keeper according to the present invention is finely pulverized electrically insulative powders such as alumina, $MgFe_2O_4$, $ZnFe_2O_4$, or the like. These powders are mixed with a binder and shaped into a sheet in the same way as mentioned above.

The magnetic ferrite sheet and the non-magnetic sheet thus obtained are laminated and subjected to a suitable hot press to form a monolithic composite sheet which comprises a flat ferromagnetic ferrite portion and a flat non-magnetic portion firmly attached together.

The monolithic composite sheet itself is so flexible that the step of embedding driving wires into the composite sheet under pressure with the deformation of the flat ferromagnetic and non-magnetic portions is effected easily even though the spaces between the adjacent driving wires is reduced as small as about 0.5 mm.

When the thermosetting resin has been used as the binder, the sheet having the driving wires embedded therein is then subjected to heating at an elevated temperature for a sufficient period to cause required hardening of the thermosetting resin, thereby producing a desired solid magentic keeper.

The method of the present invention can be also applied with ease to fill the non-magnetic substance into spaces between magnetic wires crossing at right angles with the driving wires. Namely, after the driving wires have been embedded into the monolithic composite sheet in the manner described above, a plurality of metal wires, such as piano wires, are arranged in parallel to each other above the driving wires to cross at right angles with the latter. These metal wires are depressed in a hot press, whereby the driving wires are further forced into the interior of the composite sheet by the metal wires and, consequently, the flexible ferrite sheet and the non-magnetic sheet are plastically deformed under such depressing force to allow the plastic ferrite powders to extend into spaces between a plate of the depressing apparatus and the metal wires until finally such spaces are completely filled up. The metal wires are then removed therefrom to leave grooves, in which magnetic wires are fitted later. In the magnetic keeper thus produced, the flux path around the driving wires is closed without leakage thereof. Also, the induced magnetic flux is converged closely around the driving wires, thereby allowing increase of the memory elements to be contained in the magnetic keeper. Using such magnetic keepers, it will become possible to provide reliable memories of high packing density of memory elements.

The aforementioned and other objects and features of the invention will be apparent from the following detailed description of specific embodiments thereof, when read in conjunction with the accompanying drawings, in which:

FIG. 1 is a partially sectioned perspective view showing a part of a magnetic keeper produced in accordance with a method of the present invention, FIG. 2 is a sectioned view showing the state of convergence of magnetic flux around driving wires, and FIG. 3 is a partially sectioned and partially broken-away perspective view showing another magnetic keeper produced in accordance with another method of the present invention.

EXAMPLE 1

100 g. of ferromagnetic ferrite powders of fine crystallized grains (grain size: several microns) were added to 6 g. of polyvinyl alcohol, 3 g. of glycerine and 50 cc. of water to prepare a mixture. The mixture was well kneaded and then subjected to rolling to obtain a flexible ferrite sheet which is 0.2 mm. in thickness, 120 mm. in length and 90 mm. in width.

Then, alumina powders which have no magnetic property were mixed with above-mentioned substances under the same conditions. The mixture was rolled to obtain a non-magnetic sheet of 0.4 mm. in thickness.

These two sheets were laminated and subjected to hot pressing at a temperature of 90° C. under a pressure of 0.3 t./cm.$^2$ to form a monolithic composite sheet.

Then a plurality of polyurethane-coated driving wires each being rectangular in section (0.2 mm. x 0.1 mm.) were arranged in parallel at intervals at 0.5 mm. on the ferrite sheet side of the composite sheet. The driving wires were uniformly embedded into the ferrite sheet under a hot press of 0.15 t./cm.$^2$ at a temperature of 90° C. for two minutes.

A magnetic keeper thus obtained in accordance with the present invention is shown in FIG. 1 in which reference numeral 1 denotes the ferromagnetic ferrite sheet portion, 2 the non-magnetic sheet portion, 3 driving wires each being coated with polyurethane layer 4, and 5 the electroplated magnetic wires. It will be apparent from FIG. 1 that each driving wire 3 is enclosed thereabout by ferromagnetic ferrite sheet portion 1 and spaces outside of the ferrite sheet portion and between the driving wires are filled with non-magnetic sheet portion 2.

EXAMPLE 2

In the same way as the Example 1, a monolithic composite sheet composed of a flexible ferromagnetic ferrite sheet 1 and a non-magnetic sheet 2 was obtained. A metallic wire gauze 7 was placed on the non-magnetic sheet side to act as ground mesh and a plurality of driving wires 3 coated with polyurethane layer 4 were arranged on the ferrite sheet side in the same way as Example 1, and they were embedded into the composite sheet from both sides thereof by a hot press.

Then, a plurality of metal wires (not shown) each of which is rectangular in section in the size of 0.2 mm. x 0.1 mm. were arranged in parallel to each other at intervals of 0.4 mm. on the embedded driving wires so as to cross at right angles with the latter. The metal wires were uniformly depressed against the composite sheet by a hot press. Thereafter, the rectangular metal wires were removed, thereby producing a magnetic keeper shown in FIG. 3.

Within parallel grooves 8 left on the ferrite sheet side 1 of the composite sheet, a plurality of magnetic wires (not shown) are to be disposed. At the bottom portions of the grooves 8, the driving wires 3 are exposed at their upper surface and extend transversely relative to the grooves. Between each adjacent groove is provided a square-shaped ridge 9 formed of the composite sheet portion that was formed by plastic deformation during hot pressing of the metal wires.

The method according to the present invention is so constructed that the magnetic keeper which will effectively converge the magnetic flux around the driving wires as shown in FIG. 2 is produced with ease.

Though the present invention has been described with reference to the preferred embodiments thereof, many modifications and alternations may be made within the spirit of the present invention.

What is claimed is:

1. A method for producing a magnetic keeper comprising the steps of forming a flexible ferrite sheet containing fine ferromagnetic ferrite powders cohesively bonded together by plastic resin binder, forming a flexible sheet containing fine powders of non-magnetic substance cohesively bonded together by a plastic resin binder, forming a monolithic composite sheet by laminating said sheets together using heat and pressure, and pressing a plurality of driving wires into the ferromagnetic ferrite sheet side of said monolithic composite sheet so that said driving wires are parallel to one another to thereby effect plastic deformation of the flexible non-magnetic sheet portion along with the deformation of the flexible ferrite sheet portion such that said driving wires become embedded in said ferromagnetic ferrite sheet side of said monolithic composite sheet and such that non-magnetic substance is present between adjacent driving wires.

2. The method of claim 1 and further comprising the steps of arranging a plurality of metal wires so that said metal wires are parallel to one another and at right angles to said driving wires, hot pressing said metal wires into said ferromagnetic ferrite sheet side of said monolithic composite sheet above said driving wires to thereby effect plastic deformation of said flexible ferrite sheet portion such that said metal wires become embedded therein, removing said metal wires from said monolithic composite sheet after said sheet has hardened to form grooves therein, and placing magnetic wires in said grooves.

3. The method of claim 1 in which said driving wires are coated with polyurethane.

4. The method of claim 2 in which said plastic resin binders are thermoplastic resin binders.

References Cited

UNITED STATES PATENTS

| | | | |
|---|---|---|---|
| 3,674,914 | 7/1972 | Burr | 156—166 |
| 3,696,506 | 10/1972 | Sinclair | 340—174 BC |
| 3,604,109 | 9/1971 | Crimmins | 340—174 BC |
| 2,539,690 | 1/1951 | Boorn | 156—298 |
| 2,247,558 | 7/1941 | Nichols | 156—303.1 |

DANIEL J. FRITSCH, Primary Examiner

U.S. Cl. X.R.

156—178, 222, 298, 303.1, 306; 264—104; 340—174 BC, 174 JA